(No Model.)
C. A. R. HAMPEL.
CASTING MOLD.
No. 529,906. Patented Nov. 27, 1894.
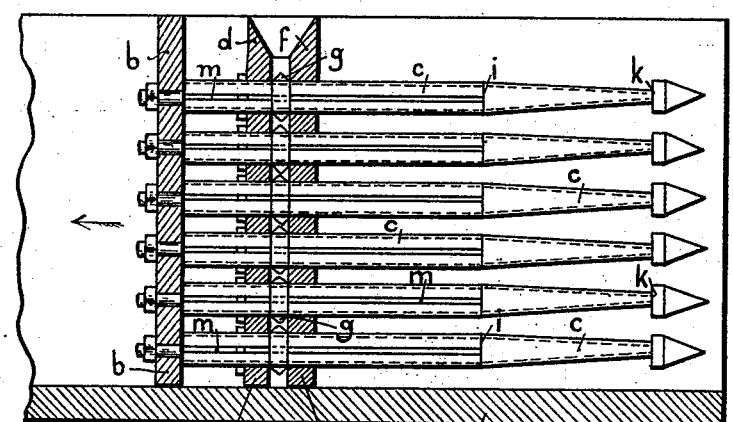
Fig I.
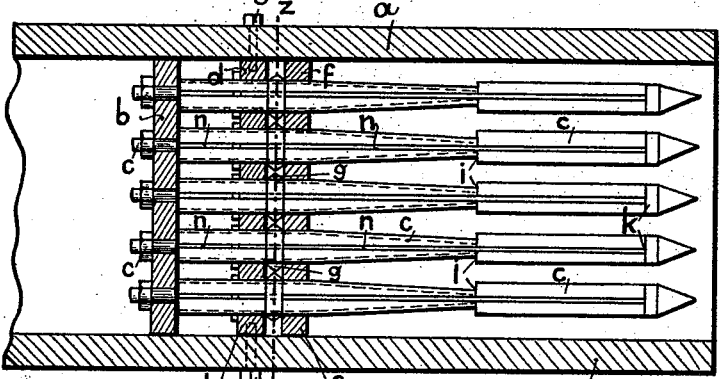
Fig II.
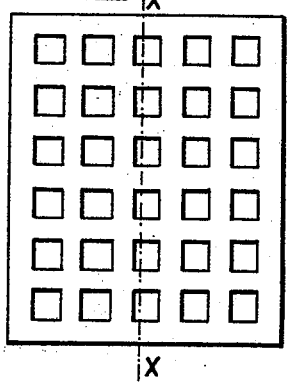
Fig III.
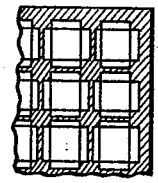
Fig IV.
Fig V.
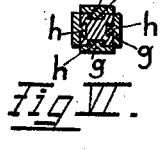
Fig VI.
WITNESSES
J. Petri-Palmedo
Ernest Miller
INVENTOR
C. A. R. Hampel
by Oscar Gunz
ATTORNEY
THE NORRIS PETERS CO., PHOTO-LITHO., WASHINGTON, D. C.

UNITED STATES PATENT OFFICE.

CARL ALBERT RUDOLPH HAMPEL, OF LEOPOLDSHALL, GERMANY.

CASTING-MOLD.

SPECIFICATION forming part of Letters Patent No. 529,906, dated November 27, 1894.

Application filed June 18, 1894. Serial No. 514,908. (No model.)

*To all whom it may concern:*

Be it known that I, CARL ALBERT RUDOLPH HAMPEL, a subject of the Duke of Anhalt, and a resident of Leopoldshall, in the Dukedom of Anhalt and Empire of Germany, have invented certain new and useful Improvements in Casting-Molds, of which the following is a specification.

This invention relates to improvements in devices for casting plates for receiving and holding the active mass of secondary or storage batteries.

The object of my invention is to provide a new and improved device for casting such plates so that a series of openings is formed in said plate for receiving and holding the active mass, which openings have their sides beveled outward and from each other from the center of each side of the opening to the two faces of the plate. In the plates heretofore used and in which the openings were so formed as to decrease in area from the central plane of the plate toward the two faces, the two halves forming the plate had either to be arranged and held a short distance from each other or they had to be connected by bars and with the latter construction such plates could only be cast in sand. With both constructions but a very limited active surface is obtained and the active mass placed into the openings forms a homogenous and integral mass. The result is that in charging and discharging the battery the unavoidable contraction and expansion of the active mass is distributed throughout and over the entire mass and causing warping of the electrodes and subsequent entire destruction of the same.

In the accompanying drawings, forming a part of this specification, and in which like letters of reference indicate like parts in all the views, Figure I is a vertical longitudinal sectional view of my improved mold, parts of the casing being broken away and the non essential elements for shifting parts of the casting device are omitted. Fig. II is a horizontal sectional view of the device. Fig. III is a face view of a secondary battery plate produced in my improved mold. Fig. IV is a vertical sectional view on the line $x\ x$ of Fig. III. Fig. V shows part of the plate in longitudinal section on the line $y\ y$ of Fig. IV. Fig. VI is a detail sectional view through one of the core bars on the line $z\ z$ of Fig. II.

The plate $b$ is mounted movably in the casing or box $a$ and is guided by its bottom edge and its two side edges. The said plate $b$ is provided with as many core bars $c$ as there are to be openings in the plate to be cast, said core bars projecting from one face of the plate $b$ and all extending in the same direction. Said core bars are all arranged the same distance apart and are guided by passing through apertures in a plate $d$ which is fixed transversely in the casing and is held in place by screws $e$ or if desired by any other suitable devices. The core bars $c$ also pass through apertures of a plate $f$ adjacent to the plate $d$ and movable in the casing $a$, it being guided in its movements in the casing by its side and bottom edges. The molten metal is cast into the space between the plates $d$ and $f$, those parts of the core bars $c$ between said plates forming the openings in the cast plate.

For the purpose of shaping the sides of the openings in the cast plate so that they are beveled from the central plane of the plate toward each face, small prismatic pieces $g$ are placed on the core bars $c$ between the plates $d$ and $f$, one prismatic piece $g$ being placed on each side of each core bar. Each prismatic piece $g$ is provided on its inner edge with a dovetailed lug $h$ which slides in a longitudinal dovetailed groove $m$ or $n$ in the corresponding face or side of the core bar.

For the purpose of permitting of the ready removal of the prismatical pieces $g$ from the cast plate, the core bar $c$ is shaped prismatically from the plate $b$ to the outer face of the plate $f$, that is, said core piece has uniform cross section throughout this length and from the outer surface of said plate $f$ to a point, a greater or less distance from the same, two opposite sides of the core bar are inclined toward each other to the shoulder $i$. From the shoulder $i$, to near the free end of the core bar the other two opposite sides are inclined toward each other, the other two sides now being parallel and the cross section of the core piece at the shoulder $i$ being the same as between the plates $d$ and $f$. A tapered or pointed head $k$ is formed on the free end of each core bar to facilitate passing the core bars through the openings in the plates $d$ and $f$.

The dovetailed grooves $m$ and $n$ for receiving the dovetailed lugs $h$ of the prismatical pieces $g$ always follow the inclinations of the sides in which they are formed so that as said pieces $g$ are moved toward the shoulder $i$ or head $k$, they are at the same time moved toward the longitudinal central axis of the corresponding core bar $c$. As shown the grooves $m$ extend to the shoulder $i$ only whereas the grooves $n$ extend to the heads $k$.

After a plate has been cast the plate $b$ is moved in the direction from the plates $d$ and $f$ as indicated by the arrow in Fig. 1 and thereby the core bars are drawn out of the plate cast and out of the plates $d$ and $f$. The prismatical pieces $g$ remain in the cast plate until the shoulder $i$ or head $k$ have successively arrived at the cast plate in moving in the direction of the arrow and by that time the said pieces have been moved toward the central axis of the core sufficiently not to project beyond the greatest cross section of the core bar so that said pieces $g$ with the core bar can pass through the apertures in the cast plate and in the plates $d$ and $f$. After the core bars have been withdrawn the plate $f$ is moved slightly from the plate $d$ to permit of removing the cast plate from the casing $a$. The core bars are then again pushed through the plates $d$ and $f$ which are brought as close to each other as the prismatical pieces $g$ permit.

In place of making the prismatical pieces $g$ triangular in cross section as shown they may have a cross section of any other suitable shape.

Having thus described my invention, what I claim as new, and desire to secure by Letters Patent, is—

1. A device for casting plates provided with openings the side edges of which are beveled from the central plane of the plate outward to the two faces thereof composed of a casing, a sliding plate in the same, as many core bars projecting from said sliding plate as openings are to be provided in the cast plate, two plates in the casing and between which the metal is cast, and prismatical pieces placed on the sides of the core bars, between said two plates and provided with dovetailed lugs mounted to slide in dovetailed grooves of the said core bars which core bars are tapered substantially as herein shown and described.

2. In a device for casting plates having openings, the edges of which are tapered from the central plane of the plate to the two faces of the same, the combination with a casing of a plate mounted to slide in the same, two plates in said casing and between which the molten metal is poured as many core bars projecting from the sliding plate as there are to be openings in the cast plate, which core bars pass through openings in the other two plates said core bars having two opposite sides tapered toward a shoulder at about half the length of the core bar dovetailed longitudinal grooves in said tapered sides and extending to the shoulder, the other two opposite sides of the core bar being tapered from the shoulder to the end of the core pieces and having dovetailed longitudinal grooves throughout their entire length, a prismatical piece on each side of each core bar each prismatical piece having a dovetailed lug mounted to slide in one of the grooves of the core bar substantially as herein shown and described.

In witness whereof I have signed this specification in presence of two witnesses.

CARL ALBERT RUDOLPH HAMPEL.

Witnesses:
WILH. HABERLEIN,
HANS HAESEN.